US011994324B2

(12) United States Patent
Yang et al.

(10) Patent No.: US 11,994,324 B2
(45) Date of Patent: May 28, 2024

(54) MULTI-OUTDOOR UNIT PARALLEL TYPE NON-REVERSING DEFROSTING SYSTEM AND DEFROSTING CONTROL METHOD THEREOF

(71) Applicant: Guangdong Giwee Technology Co. Ltd., Foshan (CN)

(72) Inventors: Yantu Yang, Guangdong (CN); Huandi Yang, Guangdong (CN); Defu Gao, Guangdong (CN)

(73) Assignee: Guangdong Giwee Technology Co. Ltd., Foshan (CN)

( * ) Notice: Subject to any disclaimer, the term of this patent is extended or adjusted under 35 U.S.C. 154(b) by 0 days.

(21) Appl. No.: 17/724,738

(22) Filed: Apr. 20, 2022

(65) Prior Publication Data

US 2022/0333837 A1    Oct. 20, 2022

(51) Int. Cl.
*F25B 47/02* (2006.01)
*F24F 11/42* (2018.01)
(Continued)

(52) U.S. Cl.
CPC ............ *F25B 47/022* (2013.01); *F24F 11/42* (2018.01); *F25B 41/24* (2021.01); *F25B 49/02* (2013.01);
(Continued)

(58) Field of Classification Search
CPC ........ F25B 47/022; F25B 41/24; F25B 49/02; F25B 2400/23; F25B 2600/2501;
(Continued)

(56) References Cited

U.S. PATENT DOCUMENTS

| 6,851,273 B2 * | 2/2005 | Jang | F25B 47/022 62/278 |
|---|---|---|---|
| 2004/0216480 A1 * | 11/2004 | Jang | F25B 47/022 62/278 |

(Continued)

FOREIGN PATENT DOCUMENTS

| CN | 203385256 U | 1/2014 |
|---|---|---|
| CN | 104764111 A | 7/2015 |

(Continued)

OTHER PUBLICATIONS

European Search Report for Application No. 22168863.3; dated Sep. 29, 2022; 7 Pages.
Chinese Office Action for Application No. 202110422994.6, dated Jan. 6, 2022, 15 Pages.

*Primary Examiner* — Henry T Crenshaw
(74) *Attorney, Agent, or Firm* — CANTOR COLBURN LLP

(57) ABSTRACT

A multi-outdoor unit parallel type non-reversing defrosting system, which includes an indoor heat exchanger and three or more outdoor units arranged in parallel. The outdoor units each include a compressor, a four-way valve, an outdoor heat exchanger, a first solenoid valve, and a bypass branch. Two ends of the bypass branch are respectively in bypass connection with a pipeline between the four-way valve and the outdoor heat exchanger and a pipeline between the first solenoid valve and the indoor heat exchanger. The bypass branch is provided with a second solenoid valve configured to control connection and disconnection of the bypass branch. When it is monitored that any outdoor unit is abnormal in frosting, the outdoor units which are not frosted are correspondingly distributed and started as required on the basis of a current heating energy requirement A of the indoor heat exchanger.

7 Claims, 2 Drawing Sheets

(51) Int. Cl.
*F25B 41/24* (2021.01)
*F25B 49/02* (2006.01)

(52) U.S. Cl.
CPC ... *F25B 2400/23* (2013.01); *F25B 2600/2501* (2013.01); *F25B 2600/2513* (2013.01)

(58) Field of Classification Search
CPC .. F25B 2600/2513; Y02B 30/70; F24F 11/84; F24F 11/86; F24F 1/06; F24F 11/64; F24F 11/88
See application file for complete search history.

(56) References Cited

U.S. PATENT DOCUMENTS

| | | | | |
|---|---|---|---|---|
| 2010/0170270 | A1* | 7/2010 | Jang | F25B 13/00 62/81 |
| 2011/0232308 | A1* | 9/2011 | Morimoto | F25B 13/00 62/278 |

FOREIGN PATENT DOCUMENTS

| | | | |
|---|---|---|---|
| CN | 106322558 A | | 1/2017 |
| CN | 106969428 A | | 7/2017 |
| CN | 109708216 A | | 5/2019 |
| JP | 104764111 | * | 7/2015 |
| JP | 109708216 | * | 5/2019 |
| WO | 2021001869 A1 | | 1/2021 |

\* cited by examiner

MULTI-OUTDOOR UNIT PARALLEL TYPE NON-REVERSING DEFROSTING SYSTEM AND DEFROSTING CONTROL METHOD THEREOF

FOREIGN PRIORITY

This application claims priority to Chinese Patent Application No. 202110422994.6, filed Apr. 20, 2021, and all the benefits accruing therefrom under 35 U.S.C. § 119, the contents of which in its entirety are herein incorporated by reference.

TECHNICAL FIELD

The present invention relates to the technical field of multi-split air conditioning systems, and in particular, to a multi-outdoor unit parallel type non-reversing defrosting system and a defrosting control method thereof.

BACKGROUND

Most of the existing air-conditioning systems perform defrosting using a defrosting method of four-way valve reversing, including parallel modular machines. In the defrosting method, all modular machines are generally reversed and defrosted together, which causes indoor units to stop heating, resulting in insufficient comfort. Alternatively, there are several methods for implementing non-reversing defrosting by using, for example, heat storage of phase change materials, but the cost is often relatively high.

Problems existing in the above air-conditioning systems include:

When the air-conditioner is frosted, the defrosting method using four-way valve reversing will cause poor comfort.

When the air conditioner is frosted, the non-reversing defrosting method by using, for example, heat storage of phase change materials is costly.

SUMMARY OF THE INVENTION

An objective of the present invention is to overcome the deficiencies of the prior art, and to provide a multi-outdoor unit parallel type non-reversing defrosting system and a defrosting control method thereof.

In order to achieve the objective, a multi-outdoor unit parallel type non-reversing defrosting system provided by the present invention includes an indoor heat exchanger and three or more outdoor units arranged in parallel. The outdoor units each include a compressor, a four-way valve, an outdoor heat exchanger, a first solenoid valve, and a bypass branch. Four interfaces of the four-way valve are connected to a discharge end of the compressor, an air return end of the compressor, the first solenoid valve, and the outdoor heat exchanger, respectively. The first solenoid valves of the outdoor units are converged and connected to one end of the indoor heat exchanger, and the outdoor heat exchangers of the outdoor units are converged and connected to the other end of the indoor heat exchanger. Both ends of the bypass branch are respectively in bypass connection to a pipeline between the four-way valve and the outdoor heat exchanger and a pipeline between the first solenoid valve and the indoor heat exchanger. The bypass branch is provided with a second solenoid valve configured to control connection and disconnection of the bypass branch. When it is monitored that any outdoor unit is abnormal in frosting, the outdoor units which are not frosted are correspondingly distributed and started as required on the basis of a current heating energy requirement A of the indoor heat exchanger, and after the started outdoor units run to a target frequency, the outdoor units are correspondingly distributed and started as required on the basis of the heating energy requirement A and a defrosting energy requirement B of the frosted outdoor unit. Meanwhile, the bypass branch of the frosted outdoor unit is controlled to be connected till it is monitored that defrosting is completed.

Further, each of the outdoor units further includes an oil separator arranged between the discharge end of the compressor and the four-way valve.

Further, each of the outdoor units further includes a gas-liquid separator arranged between the air return end of the compressor and the four-way valve.

Further, each of the outdoor units further includes a throttling device arranged between the outdoor heat exchanger and the indoor heat exchanger.

Further, the throttling device is an electronic expansion valve.

A defrosting control method of the multi-outdoor unit parallel type non-reversing defrosting system includes the following steps:

A1. monitoring that the outdoor heat exchanger of any outdoor unit is abnormal in frosting, and acquiring a current heating energy requirement A of the indoor heat exchanger;

A2. distributing the heating energy requirement A to the outdoor units which are not frosted, selecting and starting the outdoor units as required, and making the started outdoor units run to a corresponding first target frequency;

A3. after the started outdoor units run to the corresponding target frequency, stopping the frosted outdoor unit, wherein the first solenoid valve thereof is turned off and the second solenoid valve thereof is turned on, and acquiring the defrosting energy requirement B of the frosted outdoor unit;

A4. distributing the heating energy requirement A and the defrosting energy requirement B to the outdoor units which are not frosted, selecting and starting the outdoor units as required, and making the started outdoor units run to a corresponding second target frequency; and A5. after the completion of defrosting is monitored, turning on the first solenoid valve of the original frosted outdoor unit and turning off the second solenoid valve thereof, and resetting, by the system, the defrosting energy requirement B and correspondingly controlling normal heating operations of the outdoor units according to the heating energy requirement A of the indoor heat exchanger acquired in real time.

Further, in step A4, under the premise of meeting the heating energy requirement A and the defrosting energy requirement B, the minimum number of started indoor units which are not frosted is prioritized.

Further, in step A2, under the premise of meeting the heating energy requirement A, the minimum number of started indoor units which are not frosted is prioritized.

The present invention adopts the above solution, and its beneficial effect is as follows: connection and disconnection of the bypass branch are controlled correspondingly by adjusting on and off of the second solenoid valve, so as to utilize other non-frosted outdoor units to defrost the frosted outdoor heat exchanger without non-reversing, which can effectively ensure the heating output of the indoor heat exchanger.

Figure 1:
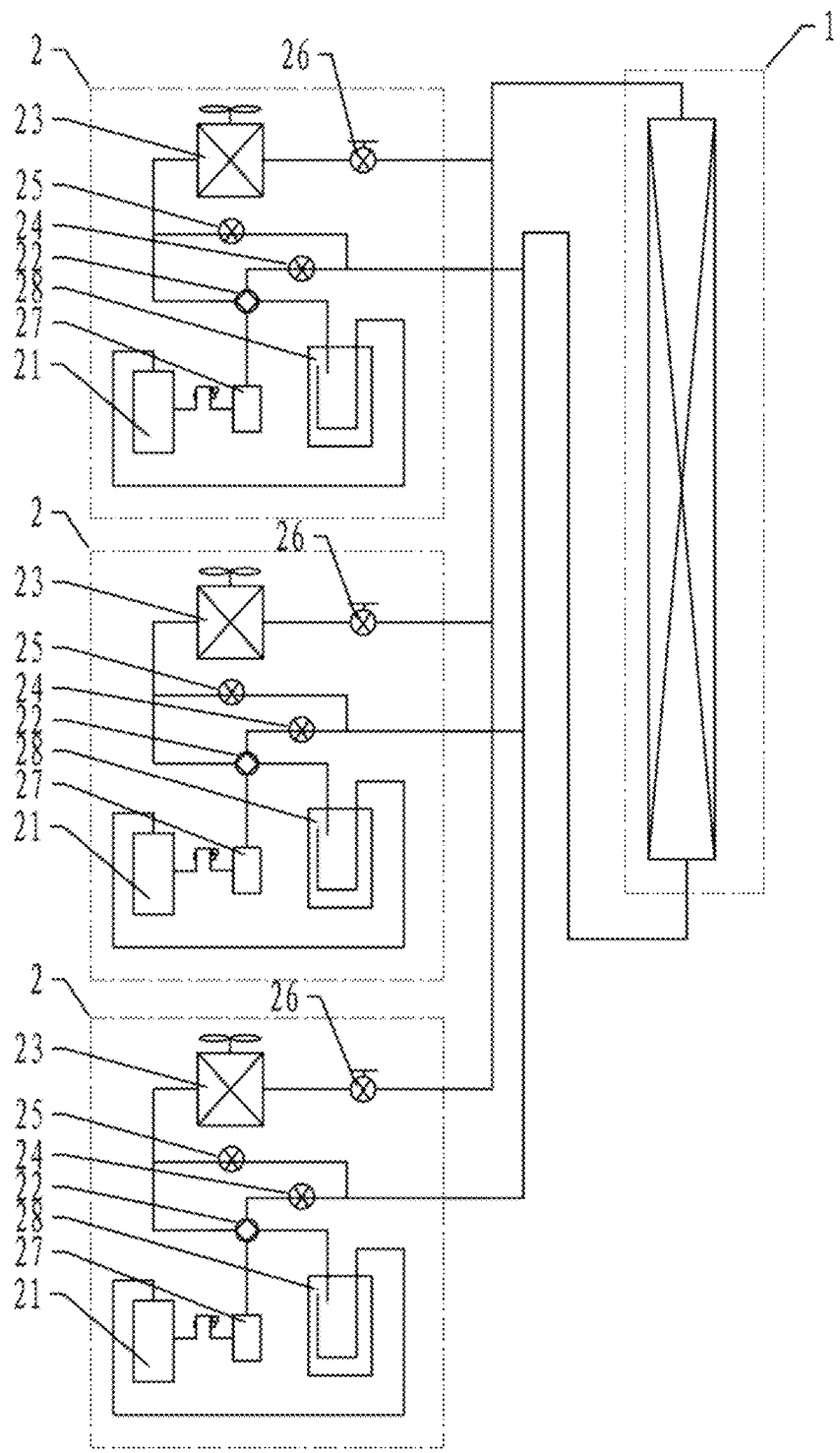
FIG. 1 is a side view of a defrosting system.
Figure 2:
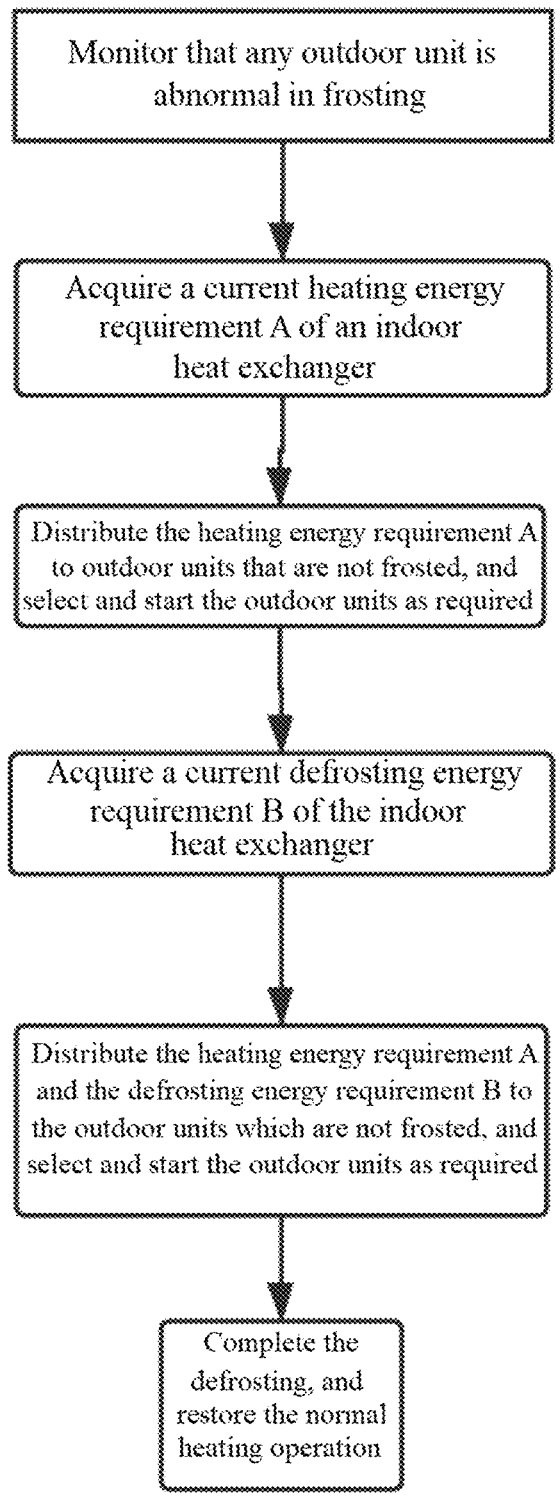
FIG. 2 is a schematic diagram of a schematic flow chart.

In the drawings, 1—Indoor heat exchanger, 2—Outdoor unit, 21—Compressor, 22—Four-way valve, 23—Outdoor heat exchanger, 24—First solenoid valve, 25—Second solenoid valve, 27—Oil separator, 28—Gas-liquid separator, 26—Throttling device.

DETAILED DESCRIPTION

In order to facilitate understanding of the present invention, the present invention will be described more fully below with reference to the accompanying drawings. Preferred implementations of the present invention are shown in the accompanying drawings. However, the present invention may be embodied in many different forms and is not limited to the implementations described herein. These implementations are provided so that a thorough and complete understanding of the present disclosure will be provided.

Referring to FIG. 1, in this embodiment, a multi-outdoor unit 2 parallel type non-reversing defrosting system includes an indoor heat exchanger 1 and three or more outdoor units 2 arranged in parallel. The outdoor units 2 each include a compressor 21, a four-way valve 22, an outdoor heat exchanger 23, a first solenoid valve 24, and a bypass branch. Four interfaces of the four-way valve 22 are connected to a discharge end of the compressor 21, an air return end of the compressor 21, the first solenoid valve 24, and the outdoor heat exchanger 23, respectively. The first solenoid valves 24 of the outdoor units 2 are converged and connected to one end of the indoor heat exchanger 1, and the outdoor heat exchangers 23 of the outdoor units 2 are converged and connected to the other end of the indoor heat exchanger 1. Both ends of the bypass branch are respectively in bypass connection to a pipeline between the four-way valve 22 and the outdoor heat exchanger 23 and a pipeline between the first solenoid valve 24 and the indoor heat exchanger 1. The bypass branch is provided with a second solenoid valve 25 configured to control connection and disconnection of the bypass branch. That is, the on/off action of the second solenoid valve 25 is controlled to control connection and disconnection of the bypass branch.

Further, each of the outdoor units 2 further includes an oil separator 27 arranged between the discharge end of the compressor 21 and the four-way valve 22.

Further, each of the outdoor units 2 further includes a gas-liquid separator 28 arranged between the air return end of the compressor 21 and the four-way valve 22.

Further, each of the outdoor units 2 further includes a throttling device 26 arranged between the outdoor heat exchanger 23 and the indoor heat exchanger 1, wherein the throttling device 26 is an electronic expansion valve.

In this embodiment, the outdoor units 2 each can run in a heating mode in a normal state. Every two outdoor units 2 run independently of each other, and one or more of the outdoor units 2 are started to run in the heating mode correspondingly according to an energy requirement of the indoor heat exchanger 1. Specifically, when any outdoor unit 2 normally runs in the heating mode, the first solenoid valve 24 and the throttling device 26 of the outdoor unit 2 are turned on, and the second solenoid valve 25 is turned off. At this time, a high-temperature and high-pressure refrigerant discharged by the compressor 21 flows through the four-way valve 22 and the first solenoid valve 24 to the indoor heat exchanger 1 to condense and release heat. The refrigerant after heat releasing enters the outdoor heat exchanger 23 through the throttling device 26 to evaporate and absorb heat. The refrigerant after heat absorption flows back to the compressor 21 through the four-way valve 22 to complete the heating cycle. As for the outdoor unit 2 in an idle state or a standby state, the first solenoid valve 24, the second solenoid valve 25, and the throttling device 26 of the outdoor unit 2 are turned off, thus isolating the refrigerant from flowing through the outdoor unit 2.

In this embodiment, when it is monitored that any outdoor unit 2 is abnormal in frosting, the outdoor units 2 which are not frosted are correspondingly distributed and started as required on the basis of a current heating energy requirement A of the indoor heat exchanger 1, and after the started outdoor units 2 run to a target frequency, the outdoor units 2 are correspondingly distributed and started as required on the basis of the heating energy requirement A and a defrosting energy requirement B of the frosted outdoor unit 2, and meanwhile, the bypass branch of the frosted outdoor unit 2 is controlled to be connected till it is monitored that defrosting is completed.

Control of the system of FIG. 1 may be performed by a controller (e.g., a microprocessor based controller) in communication with components of the system of FIG. 1 and executing a program to perform the operations described herein.

Specifically, a defrosting control method includes the following steps:

A1. monitoring that the outdoor heat exchanger 23 of any outdoor unit 2 is abnormal in frosting, and acquiring a current heating energy requirement A of the indoor heat exchanger 1;

A2. distributing the heating energy requirement A to the outdoor units 2 that are not frosted, selecting and starting the outdoor units 2 as required, and making the started outdoor units 2 run to a corresponding first target frequency;

A3. after the started outdoor units 2 run to the corresponding target frequency, stopping the frosted outdoor unit 2, wherein the first solenoid valve 24 thereof is turned off and the second solenoid valve 25 thereof is turned on, and acquiring the defrosting energy requirement B of the frosted outdoor unit 2;

A4. distributing the heating energy requirement A and the defrosting energy requirement B to the outdoor units 2 that are not frosted, selecting and starting the outdoor units 2 as required, and making the started outdoor units 2 run to a corresponding second target frequency; and A5. after the completion of defrosting is monitored, turning on the first solenoid valve 24 of the original frosted outdoor unit 2 and turning off the second solenoid valve 25 thereof, and resetting, by the system, the defrosting energy requirement B and correspondingly controlling normal heating operations of the outdoor units 2 according to the heating energy requirement A of the indoor heat exchanger 1 acquired in real time.

In step A2, the frosted outdoor unit 2 does not participate in the distribution of the heating energy requirement A and keeps running continuously, so that the frosted outdoor unit 2 and the started outdoor unit 2 are running in parallel. In this way, the heating effect of the indoor heat exchanger 1 is ensured and the influence on the heating effect is avoided.

Further, in step A2, under the premise of meeting the heating energy requirement A, the minimum number of started indoor units which are not frosted is prioritized, thereby reducing the number of started outdoor units 2 and lowering the energy consumption.

In step A3, the first solenoid valve 24 of the frosted outdoor unit 2 is turned off, and the second solenoid valve 25 thereof is turned on, thereby causing the bypass branch of the frosted outdoor unit 2 to be connected.

In step A4, under the premise of meeting the heating energy requirement A and the defrosting energy requirement B, the minimum number of started indoor units 2 that are not frosted is prioritized.

In this embodiment, in step A4, a high-temperature and high-pressure refrigerant discharged by the compressors 21 of the started outdoor units 2 that are not frosted flows through the four-way valve 22 and the first solenoid valve 24 to be divided into two paths. The first path of the refrigerant flows to the indoor heat exchanger 1 to condense and release heat. The second path of the refrigerant flows into the frosted outdoor unit 2, and then flows to the outdoor heat exchanger 23 through the bypass branch and the second solenoid valve 25 to release heat for defrosting. Then, the first path of refrigerant and the second path of refrigerant are converged and flows back to the compressors 21 of the outdoor units 2 that are not frosted. In this way, the heating and defrosting operations are cycled to ensure the indoor heating effect, and defrosting can be performed effectively.

The above embodiments are only preferred embodiments of the present invention, and do not limit the present invention in any form. Any person skilled in the art, without departing from the scope of the technical solution of the present invention, can make more possible variation, changes, and modifications to the technical solution of the present invention by using the technical content disclosed above, which are all equivalent embodiments of the present invention. Therefore, all identical and equivalent changes made according to the idea of the present invention without departing from the content of the technical solution of the present invention shall be covered within the protection scope of the present invention.

What is claimed is:

1. A multi-outdoor unit parallel type non-reversing defrosting system, comprising an indoor heat exchanger (1) and three or more outdoor units (2) arranged in parallel, wherein the outdoor units (2) each comprise a compressor (21), a four-way valve (22), an outdoor heat exchanger (23), a first solenoid valve (24), and a bypass branch; four interfaces of the four-way valve (22) are connected to a discharge end of the compressor (21), a refrigerant return end of the compressor (21), the first solenoid valve (24), and the outdoor heat exchanger (23), respectively; the first solenoid valves (24) of the outdoor units (2) are converged and connected to one end of the indoor heat exchanger (1), and the outdoor heat exchangers (23) of the outdoor units (2) are converged and connected to the other end of the indoor heat exchanger (1); both ends of the bypass branch are respectively in bypass connection to a pipeline between the four-way valve (22) and the outdoor heat exchanger (23) and a pipeline between the first solenoid valve (24) and the indoor heat exchanger (1); the bypass branch is provided with a second solenoid valve (25) configured to control connection and disconnection of the bypass branch; when it is monitored that any outdoor unit (2) is abnormal in frosting, the outdoor units (2) which are not frosted are operated as required on the basis of a current heating energy requirement A of the indoor heat exchanger (1), and after the started outdoor units (2) run to a target frequency, the outdoor units (2) are operated as required on the basis of the heating energy requirement A and a defrosting energy requirement B of the frosted outdoor unit (2), and meanwhile, the bypass branch of the frosted outdoor unit (2) is controlled to be connected till it is monitored that defrosting is completed.

2. The multi-outdoor unit parallel type non-reversing defrosting system according to claim 1, wherein each of the outdoor units (2) further comprises an oil separator (27) arranged between the discharge end of the compressor (21) and the four-way valve (22).

3. The multi-outdoor unit parallel type non-reversing defrosting system according to claim 1, wherein each of the outdoor units (2) further comprises a gas-liquid separator (28) arranged between the refrigerant return end of the compressor (21) and the four-way valve (22).

4. The multi-outdoor unit parallel type non-reversing defrosting system according to claim 1, wherein each of the outdoor units (2) further comprises a throttling device (26) arranged between the outdoor heat exchanger (23) and the indoor heat exchanger (1).

5. The multi-outdoor unit parallel type non-reversing defrosting system according to claim 1, wherein the throttling device (26) is an electronic expansion valve.

6. A defrosting control method of a multi-outdoor unit parallel type non-reversing defrosting system including an indoor heat exchanger (1) and three or more outdoor units (2) arranged in parallel, wherein the outdoor units (2) each comprise a compressor (21), a four-way valve (22), an outdoor heat exchanger (23), a first solenoid valve (24), and a bypass branch; four interfaces of the four-way valve (22) are connected to a discharge end of the compressor (21), a refrigerant return end of the compressor (21), the first solenoid valve (24), and the outdoor heat exchanger (23), respectively; the first solenoid valves (24) of the outdoor units (2) are converged and connected to one end of the indoor heat exchanger (1), and the outdoor heat exchangers (23) of the outdoor units (2) are converged and connected to the other end of the indoor heat exchanger (1); both ends of the bypass branch are respectively in bypass connection to a pipeline between the four-way valve (22) and the outdoor heat exchanger (23) and a pipeline between the first solenoid valve (24) and the indoor heat exchanger (1); the bypass branch is provided with a second solenoid valve (25) configured to control connection and disconnection of the bypass branch;

the method comprising:

A1 monitoring that the outdoor heat exchanger (23) of any outdoor unit (2) is abnormal in frosting, and acquiring a current heating energy requirement A of the indoor heat exchanger (1);

A2 operating the outdoor units (2) which are not frosted to meet the heating energy requirement A and making the started outdoor units (2) run to a corresponding first target frequency;

A3 after the started outdoor units (2) run to the corresponding target frequency, stopping the frosted outdoor unit (2), wherein the first solenoid valve (24) thereof is turned off and the second solenoid valve (25) thereof is turned on, and acquiring the defrosting energy requirement B of the frosted outdoor unit (2);

A4 operating to the outdoor units (2) which are not frosted to meet the heating energy requirement A and the defrosting energy requirement B and making the started outdoor units (2) run to a corresponding second target frequency; and A5 after the completion of defrosting is monitored, turning on the first solenoid valve (24) of the original frosted outdoor unit (2) and turning off the second solenoid valve (25) thereof, and resetting, by the system, the defrosting energy requirement B and correspondingly controlling normal heating operations of the outdoor units (2) according to the heating energy requirement A of the indoor heat exchanger (1) acquired in real time;

wherein in A4, a minimum number of outdoor units which are not frosted are operated in order to meet the heating energy requirement A and the defrosting energy requirement B.

7. A defrosting control method of a multi-outdoor unit parallel type non-reversing defrosting system including an indoor heat exchanger (1) and three or more outdoor units (2) arranged in parallel, wherein the outdoor units (2) each comprise a compressor (21), a four-way valve (22), an outdoor heat exchanger (23), a first solenoid valve (24), and a bypass branch; four interfaces of the four-way valve (22) are connected to a discharge end of the compressor (21), a refrigerant return end of the compressor (21), the first solenoid valve (24), and the outdoor heat exchanger (23), respectively; the first solenoid valves (24) of the outdoor units (2) are converged and connected to one end of the indoor heat exchanger (1), and the outdoor heat exchangers (23) of the outdoor units (2) are converged and connected to the other end of the indoor heat exchanger (1); both ends of the bypass branch are respectively in bypass connection to a pipeline between the four-way valve (22) and the outdoor heat exchanger (23) and a pipeline between the first solenoid valve (24) and the indoor heat exchanger (1); the bypass branch is provided with a second solenoid valve (25) configured to control connection and disconnection of the bypass branch;

the method comprising:

A1 monitoring that the outdoor heat exchanger (23) of any outdoor unit (2) is abnormal in frosting, and acquiring a current heating energy requirement A of the indoor heat exchanger (1);

A2 operating the outdoor units (2) which are not frosted to meet the heating energy requirement A and making the started outdoor units (2) run to a corresponding first target frequency;

A3 after the started outdoor units (2) run to the corresponding target frequency, stopping the frosted outdoor unit (2), wherein the first solenoid valve (24) thereof is turned off and the second solenoid valve (25) thereof is turned on, and acquiring the defrosting energy requirement B of the frosted outdoor unit (2);

A4 operating to the outdoor units (2) which are not frosted to meet the heating energy requirement A and the defrosting energy requirement B and making the started outdoor units (2) run to a corresponding second target frequency; and A5 after the completion of defrosting is monitored, turning on the first solenoid valve (24) of the original frosted outdoor unit (2) and turning off the second solenoid valve (25) thereof, and resetting, by the system, the defrosting energy requirement B and correspondingly controlling normal heating operations of the outdoor units (2) according to the heating energy requirement A of the indoor heat exchanger (1) acquired in real time;

wherein in A2, a minimum number of outdoor units which are not frosted are operated in order to meet the heating energy requirement A.

* * * * *